Nov. 25, 1969   J. E. O'DONNELL   3,480,287
BORING TOOL HEAD
Filed March 14, 1967

INVENTORS
JAMES E. O'DONNELL
BY
    Nicholas A. Pendosio
ATTORNEY

United States Patent Office 3,480,287
Patented Nov. 25, 1969

3,480,287
BORING TOOL HEAD
James E. O'Donnell, 15 Sparhawk Road,
Lynn, Mass. 01905
Filed Mar. 14, 1967, Ser. No. 623,044
Int. Cl. B23b 29/04
U.S. Cl. 279—6
6 Claims

ABSTRACT OF THE DISCLOSURE

The following specification describes an adjustable boring tool holder comprising means for gripping the end of a boring tool and means operative by flexing the shank of the tool to radially shift the position of its cutting edge relative to the axis of rotation of the tool holder.

---

This invention relates to adjustable boring heads and more particularly to a tool holder adapted to support and accurately adjust the radial position of a boring tool relative to the axis of a machine spindle or chuck, thereby estabishing the diameter of the hole to be formed by the tool in a workpiece.

In machine tool practice it is common to support boring tools in eccentric boring heads which are adjustable to permit a high degree of precision in the size and location of holes made by the boring tools. Eccentric boring heads, also called "offset boring heads," generally comprise a body adapted to be secured to a machine spindle or mounted in a chuck, a tool carrier, means connecting the tool carrier and the body that permits relative movement of the tool carrier in a direction transverse to its axis so that the cutting edge of the tool mounted in the tool carrier can be accurately positioned in eccentric relation to the axis of rotation of the body and the spindle or chuck to which it is connected, and means for indicating according to the position of the tool carrier the diameter of the hole to be formed by the cutting tool. Many different types of eccentric boring heads are known, typical of which are those shown in U.S. Patents 2,511,884, 2,654,610 and 2,780,467. In addition to the basic features mentioned above, the prior art devices usually comprise other structural features, e.g. means for eliminating backlash and means for locking and interlocking parts, that make them expensive and bulky and not entirely satisfactory for small boring tools.

Accordingly the primary object of this invention is to provide a new and improved boring tool holder that is of relatively simple construction, may be made at low cost, and is particularly suited for small boring tools.

A more particular object of this invention is to provide an improved boring heat that consists of only a few parts and is adapted to permit precision boring of small holes.

Another particular object is to provide a boring head which is adapted to receive and support one of the usual hole boring or finishing tools and is adapted to adjust the position of the cutting or working edges of the tool by small increments, e.g. in the order of 0.0001 inch.

These and other objects described or rendered obvious from the following specification are achieved by a construction comprising a tool holder body, means in the tool holder body for receiving and gripping the end of a boring tool, a sleeve projecting into the body having a longitudinally extending bore through which the tool is inserted into the gripping means, and means for retaining the sleeve in the body. The sleeve is rotatable relative to the body and the inserted tool and the inner end of the sleeve forces the tool gripping means to exert a tight grip on the inserted tool so that the latter cannot rotate relative to the tool holder body. At least a portion of the sleeve's longitudinally extending bore is disposed eccentric to the longitudinal axis of the tool holder body and the bore is stepped so that the tool is engaged only by the outer end portion of the sleeve. With this construction, rotation of the sleeve will cause the tool to flex and its cutting edge to move radially toward or away from the longitudinal axis of the body, thereby adjusting the size of the hole that may be formed by the tool when it is brought into engagement with a workpiece. A vernier indicator also is provided to facilitate precision adjustment of the cutting edge of the tool. Other features are described in the following specification which is to be considered together with the accompanying drawings, wherein:

Figure 1:
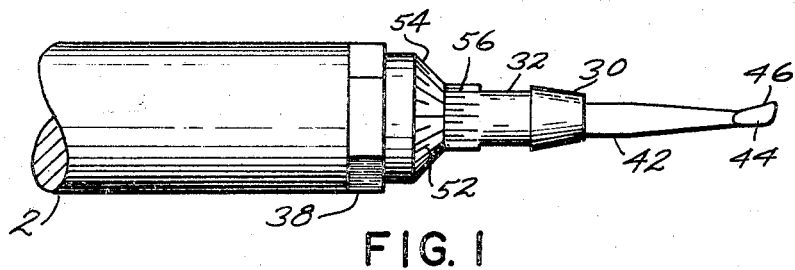
FIG. 1 is an elevational side view of a preferred form of my invention.
Figure 2:
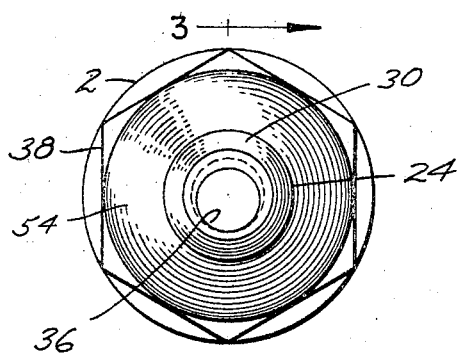
FIG. 2 is an end view of the same device (but with the cutting tool removed) looking from right to left in FIG. 1.
Figure 4:
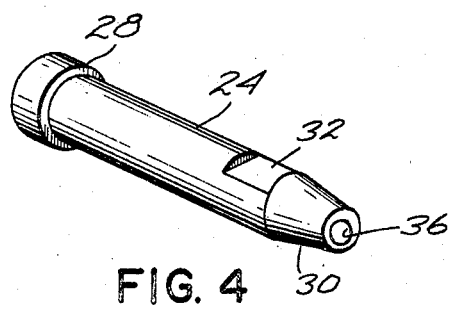
FIG. 4 is a perspective view of one of the members of the same device.
Figure 3:
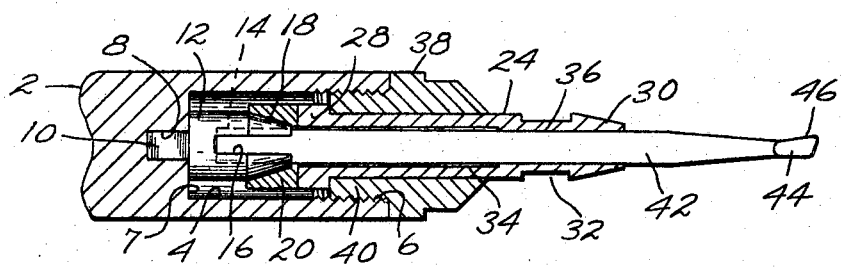
FIG. 3 is a longitudinal sectional view taken along line 3—3 of FIG. 2.

Referring first to FIG. 1 the illustrated embodiment of my invention comprises a tool holder body 2 that is dimensioned so as to be secured to a machine spindle or mounted in a chuck in the usual manner. The left-hand end, omitted from the drawings, may have a reduced size so as to form a shank or the tool holder body 2 may have a constant diameter throughout. At its right-hand end (as seen in FIGS. 1 and 3) the body 2 is formed with an axial bore 4 provided with internal threads 6 at its outer end. The inner end of the axial bore 4 terminates in a flat surface 7 surrounding a cavity or hole 8. The purpose of the cavity 8 is to receive the stem 10 of an anchor grip member 12. The cavity 8 and stem 10 are made with cross-sections such that the stem cannot rotate in the cavity. Thus they may have matching polygonal cross-sections or may have non-polygonal cross-sections with means, e.g. matching grooves and ribs or flats, that lock the stem against rotation. The anchor grip member may be force fitted or soldered in place so that it is a more or less permanent part of body 2, or it may be removeable. In its preferred form the anchor grip member 12 is made with an axially extending cavity 14 at the end opposite stem 10. Additionally this hollow portion of the anchor grip member is split or bifurcated by diametrically opposed slots, one of which is shown at 16 in FIG. 3. This bifurcated end is bevelled so as to have a frusto-conical exterior surface 18.

Surrounding the bevelled end of the anchor grip member is a pressure ring 20 whose inner surface is tapered so as to fit over and mate with the tapered surface 18 of the anchor grip member. The outer end surface of ring 20 is preferably but not necessarily flat.

Also located within the axial bore 4 of the holder body 2 is an elongated sleeve 24. At its inner sleeve 24 is formed with an annular flange 28 with an end surface that is adapted to mate with and bear against the adjacent outer end surface of pressure ring 20. Forward of flange 28, the outer surface of sleeve 24 is of substantially constant diameter, except that it may be tapered as shown at 30 for appearance purposes and has a pair of opposed flats 32 to facilitate rotation thereof by means of a wrench or pliers. Internally sleeve 24 has a first constant diameter longitudinally extending bore 34 that commences at its flanged end (the left-hand end as seen in FIG. 3) and extends for about two thirds of the length of the sleeve. This bore is coaxial wtih sleeve 24. For its remaining length the sleeve has a second bore 36 that has a smaller diameter than bore 34. This reduced diameter bore 36 is eccentric to the longitudinal axis of sleeve 24.

Sleeve 24 is retained within the body 2 by a bushing or clamp nut 38 having a threaded extension 40 which mates with the internal threads 6. The inner end of threaded extension 40 engages flange 28 of sleeve 24 and urges it against pressure ring 20 which in turn is pressed against anchor grip member 12. In essence flange 28 is captivated between the pressure ring 20 and the clamp nut 38 so that its sleeve 24 cannot move axially relative to the holder body 2 (unless, of course, the clamp nut 38 is backed off). The pressure exerted by the clamp nut also tends to resist rotation of sleeve 24. In practice the clamp nut is made so that when it is screwed up tight, the pressure exerted by it on sleeve 24 will be sufficiently great to prevent the sleeve from being rotated under the vibration and shock forces normally encountered in ordinary use but not so great that the sleeve cannot be turned by a wrench or pliers acting on flats 32.

The foregoing conestruction is adapted to support a conventional cutting tool such as the one illustrated in FIGS. 1 and 3. This tool comprises an elongate shank portion 42 and a cutting portion 44 having a cutting edge 46. To mount the cutting tool in the tool holder it is necessary only to back off the clamping nut 38 enough so that the pressure ring 20 does not bear against the anchor grip member 12. When this has been done the shank 42 of the tool is inserted through sleeve 24 into the anchor grip 12. Once this has been done, the tool is secured in place by turning the clamp nut until the pressure exerted by the wedging action of ring 20 on the anchor grip member is sufficient to lock the tool in place so that it cannot be pulled out or rotated relative to the holder body 2. At this point it is to be appreciated that the sleeve 24 does not engage the shank 42 of the tool for the entire length of the sleeve but only in the region of the eccentric bore 36. The only other portion of the tool shank 42 that is supported is its inner end which is engaged by grip member 12. With this arrangement, rotation of sleeve 24 relative to the holder body 2 will cause the eccentric bore 36 to move in a circular orbit about the axis of the tool holder body. The circular orbit necessarily involves a corresponding circular movement of the tool shank which flexes about its stationary end. As the shank 42 moves under the influence of sleeve 24, the cutting edge 46 of the tool will also move. The latter will move toward and away from the longitudinal axis of the body 2, the direction of movement of the cutting edge of the tool relative to the holder body axis depending upon the angular setting of sleeve 24. The amount of flexing involved is well within the flexibility range of conventional tool steels. As a matter of actual practice, the amount of flexing of shank 42 is relatively small since the distance through which the cutting edge 46 may be moved by rotating the sleeve 24 is in the order of thousandths.

To facilitates adjustment of the cutting edge 46 so as to precisely control the size of the hole which it will make, it is preferred to provide the device with a vernier indicator. This vernier indicator comprises a first graduated scale 52 provided on the tapered end face 54 of the clamp nut 38, and a second scale 56 provided on the exterior surface of sleeve 24. In this preferred embodiment the graduations of scale 52 are spaced at increments of 0.005 inch while the graduations of the scale 56 are spaced at increments of 0.0005 inch. Appropriate adjustments in the size of the hole to be made may be accomplished in increments by rotating the sleeve 24 relative to the clamping nut 38, with the successive settings of the two scales indicating the incremental changes in hole size. To facilitate use of the vernier indicator, it is preferred that each scale have a zero reference graduations. In this particular setting, the positioned so that its cutting edge 46 is aligned with both zero reference graduation and that the tool be initially tool will make the smallest hole. To increase the size of the hole, all that is necessary is to rotate sleeve 24 until the vernier indicates the desired size hole.

From the above it will be seen that the illustrated embodiment of the invention provides a novel eccentric cutting tool holder that is adapted for quick and accurate adjustment of the cutting edge to a predetermined radial position relative to the axes of the holder and the driving member to which the holder is coupled. Precise dimensioning of the hole to be made by the tool is facilitated by means of the simple and reliable vernier indicator. The illustrated construction is easy to manufacture and assemble and comparably easy to use. Because of the relatively small number of parts and the manner in which the parts are interconnected, the unit may be made in relatively small sizes and is adapted to hold tools of comparable dimensions. An important consideration is that the axial length of the unit can be greatly limited, as can the lateral dimensions of the device. In this connection it is to be noted that the vernier can be made larger and thereby easier to read by increasing the relative sizes of scale-carrying portions of sleeve 24 and clamping nut 38.

Obviously the invention is capable of many modifications. Thus, for example, the shank 42 of the tool may be anchored in a somewhat different fashion. One alternative mode of connecting the shank to the holder body 2 is to provide a pair of set screws that are mounted in the holder body and bear against the opposite sides of the anchor grip so as to force its split sections into tight clamping relation with the tool shank 42. A second alternative modification involves captivating the flange 28 of sleeve 24 in a groove formed in the clamping nut 38, with the groove being sufficiently deep so that the inner end surface of the clamping nut would directly engage the pressure ring 20. In this second modification, the sleeve 24 would still be rotatable relative to clamping nut 38 and body 2, while the pressure ring would still force the anchor grip member into a tight clamping with the shank of the boring tool. Still other modifications are believed obvious to persons skilled in the art. Accordingly, the invention is not to be limited to the specific embodiment described in the foregoing specification. Instead the foregoing specification is to be considered in all respects as illustrative rather than restrictive of the invention, and the scope of the invention is as indicated by the appended claims.

I claim:

1. An adjustable holder for a cutting tool having an elongate shank and a cutting edge at one end of said shank, said holder comprising a body with an axial bore at one end thereof, tool gripping means disposed in said bore, said tool gripping means comprising flexible means adapted to embrace the shank of a cutting tool inserted therein, a rotatable adjusting sleeve in said bore, said adjusting sleeve also being moveable axially with respect to said body and said tool gripping means and being adapted on movement axially toward said tool gripping means to cause said flexible means to contract radially into tight gripping relation with an inserted tool shank, and means releasably connected to said body for urging said sleeve axially into tight engagement with said tool gripping means so as to lock said sleeve against rotation relative to said body and cause said flexible means to contract around said inserted shank, said sleeve having a longitudinally extending bore therein through which said shank may be inserted into said tool gripping means, a portion of said bore being in eccentric relation to the longitudinal axis of said body so that rotation of said sleeve relative to said body has the effect of flexing said shank to move its cutting edge in a direction extending radially of said axis.

2. A tool holder as defined by claim 1 wherein said sleeve is provided with means permitting it to be rotated with a hand tool.

3. A tool holder as defined by claim 1 wherein said releasable means and said sleeve are provided with cooperating vernier graduations that provide an indication of the radial distance from said axis to the cutting edge of said tool.

4. A tool holder as defined by claim 1 wherein said sleeve has a flange on one end thereof, and further wherein said tool gripping means comprises a split sleeve adapted to surround said inserted shank and means engageable by said flange for forcing said split sleeve to contract about said inserted shank.

5. A tool holder for a boring tool comprising a body adapted to be mounted in coaxial relation with a chuck or machine spindle, first means mounted in said body for gripping the end of the shank of a boring tool so as to prevent movement of said end relative to said body, second means rotatably supported by said body having eccentric means for flexing said shank about its said end in a direction extending radially of the axis of said body when said second means is rotated relative to said body, and third means comprising a member secured to said body restraining said second means against rotation relative to said body.

6. A tool holder as defined by claim 5 wherein said second means is a sleeve having an axially-extending bore through which said shank may be inserted into said first means, said eccentric means comprising an interior surface of said sleeve which defines a portion of said bore remote from said first means.

References Cited

UNITED STATES PATENTS

| | | | |
|---|---|---|---|
| 2,511,884 | 6/1950 | Thomas | 279—6 |
| 2,869,879 | 1/1959 | Burton | 279—6 |
| 2,931,254 | 4/1960 | Briney | 77—58 |
| 3,266,475 | 8/1966 | Dietz | 125—11 |

ROBERT C. RIORDON, Primary Examiner

J. C. PETERS, Assistant Examiner

U.S. Cl. X.R.

77—58